April 21, 1942.                G. K. McKEE                 2,280,596
                                MACHINE TOOL
                           Filed March 9, 1940            5 Sheets-Sheet 1

INVENTOR.
GEORGE K. McKEE,
BY Joseph A. Rave
ATTORNEYS.

April 21, 1942.   G. K. McKEE   2,280,596
MACHINE TOOL
Filed March 9, 1940   5 Sheets-Sheet 2

INVENTOR.
GEORGE K. McKEE,
BY Joseph A. Rave
ATTORNEY.

April 21, 1942.  G. K. McKEE  2,280,596
MACHINE TOOL
Filed March 9, 1940  5 Sheets-Sheet 3

INVENTOR.
GEORGE K. McKEE,
BY
Joseph A. Rave
ATTORNEYS.

April 21, 1942.  G. K. McKEE  2,280,596
MACHINE TOOL
Filed March 9, 1940     5 Sheets-Sheet 4

INVENTOR.
GEORGE K. McKEE,
BY
Joseph A. Rave
ATTORNEYS.

Patented Apr. 21, 1942

2,280,596

UNITED STATES PATENT OFFICE 2,280,596

MACHINE TOOL

George K. McKee, Cincinnati, Ohio, assignor to The Avey Drilling Machine Company, Covington, Ky., a corporation of Ohio Application March 9, 1940, Serial No. 323,181

7 Claims. (Cl. 10—136)

This invention relates to improvements in machine tools, and particularly to improvements in a tapping attachment or tapping mechanism for use with drilling machines.

An object of this invention is the provision of a mechanism for tapping bored holes, and in which the direction of rotation of the tap is readily reversed.

Another object of this invention is the provision of a tapping mechanism operable by a single lever arranged at the normal feed position of a drilling machine.

A further object of this invention is the provision of a drilling machine including a tap operating mechanism wherein a single lever is employed for operating the tap and the drill feeding and retracting mechanisms.

A further object of the invention is the provision of a drilling and tapping machine, operable from a single lever, and including means for determining whether a tapping operation or a drilling operation is to be performed.

A still further object of the invention is the provision of a drilling and tapping machine, that is, a machine capable of performing both drilling and tapping operations, and in which the tapping mechanism may be completely and definitely locked out of operation.

Other objects and advantages of the present invention should be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings—

Fig. 20 is a diagrammatic view illustrating the electrical mechanism effected and controlled by the mechanism previously referred to.

Throughout the several views of the drawings, similar reference characters are employed to denote the same or similar parts.

The control mechanism, or the so-called tapping attachment of this invention may be employed with various machine tools, and while it will be described in connection with a particular machine tool, it will be understood it has equal application to other machine tools having a rotary spindle axially operable for feeding purposes.

As shown in the drawings, the tapping attachment is applied to a high speed vertical spindle type of machine, and which machine may comprise a supporting base 25, from which rises a standard or column 26. The forward face of the column 26 is provided with a dove-tailed guide 27 received in a correspondingly shaped guideway formed through the rear end of a work supporting table 28. Any suitable means, not shown, may be employed for adjusting the work supporting table vertically of the guide 27.

Mounted on the standard 26 is a column 29 having its upper end goose necked or bent outwardly as at 30 and having secured thereto or integral therewith a housing 31. The housing 31 is closed at its lower end by a plate 32 and has secured to the upper end a casing or gear box 33, in turn closed by a cover plate 34.

Figure 1:
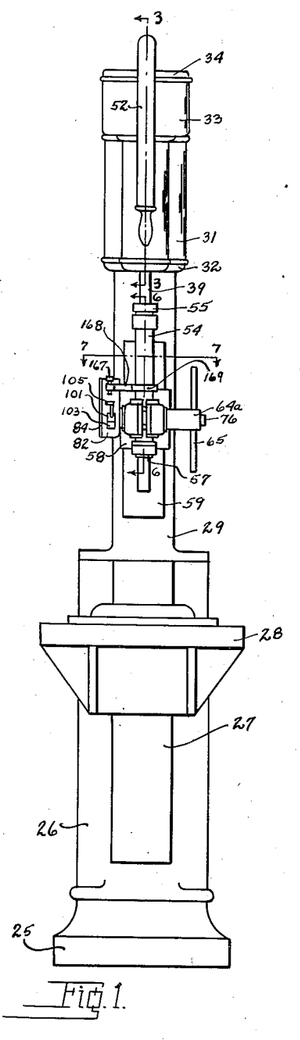
Fig. 1 is a front elevation of a drilling machine embodying the improvements of this invention.
Figure 2:
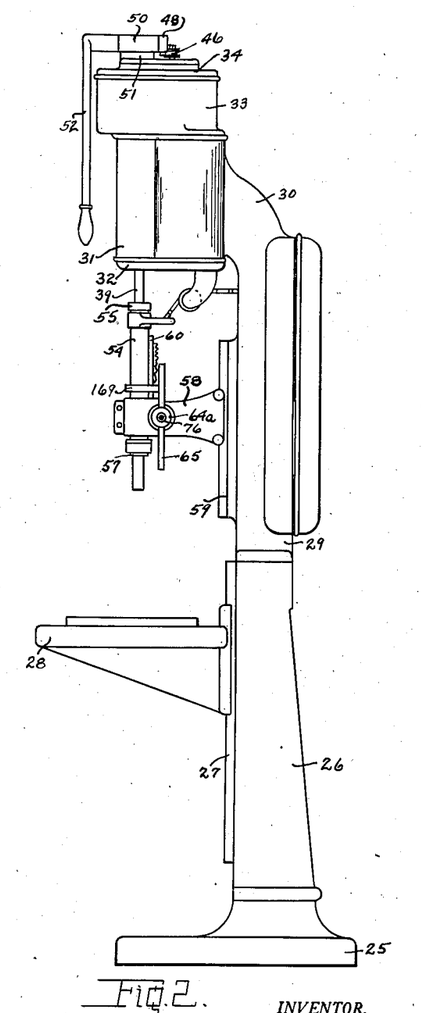
Fig. 2 is a side elevation of the drilling machine shown in Fig. 1, as seen particularly from the right hand side of said Fig. 1.
Figures 3, 4, 5, 6:
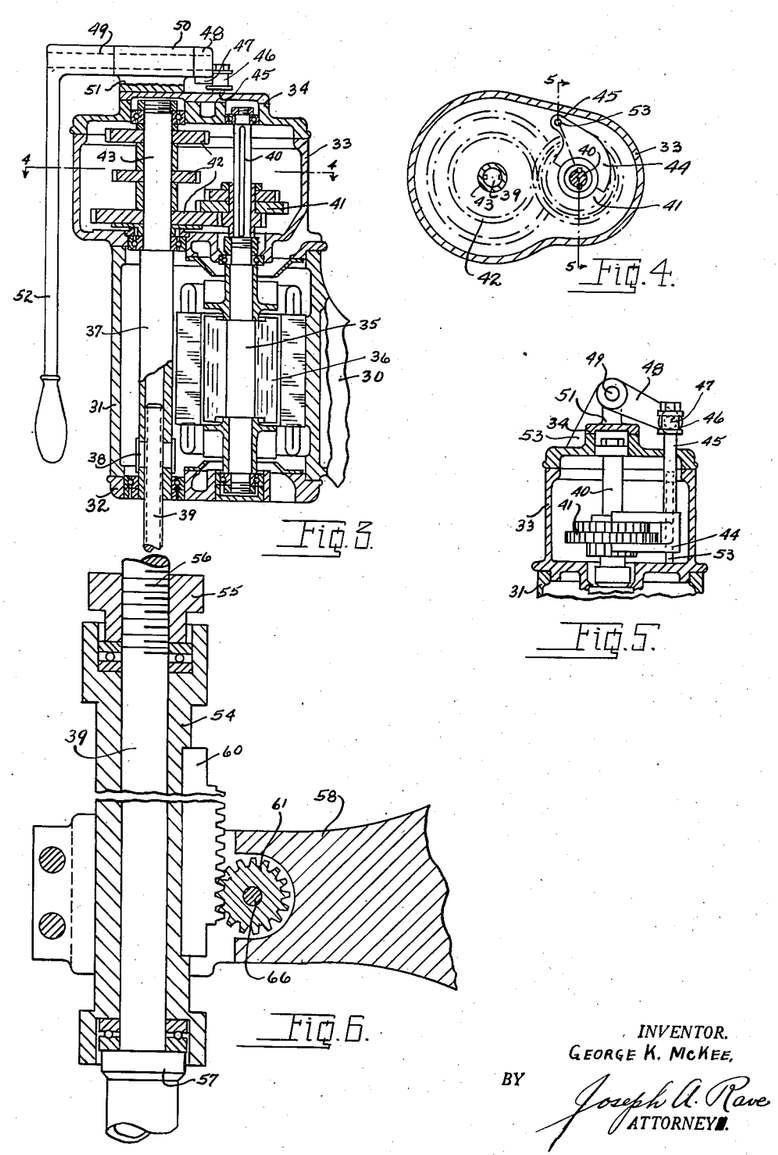
Fig. 3 is an enlarged, vertical, sectional view through the spindle drive mechanism, taken on line 3—3 of Fig. 1.
Fig. 4 is a transverse, sectional view through the speed change box of the spindle drive mechanism, taken on line 4—4 of Fig. 3.
Fig. 5 is a vertical, sectional view through a portion of the speed change mechanism, taken on line 5—5 of Fig. 4.
Fig. 6 is an enlarged, vertical, sectional view through the spindle quill support, taken on line 6—6 of Fig. 1.

As seen in Fig. 3, the housing 31 is provided with anti-friction bearings in which is journaled the motor shaft 35 of an electric motor indicated in general by the reference character 36. In addition, the housing 31 carries anti-friction bearings in which is journaled a driven sleeve 37, which carries keys 38 entering splines in the spindle 39.

The motor shaft 35 has projecting from it a splined drive shaft 40, on which is slidably mounted gear cluster 41 respectively adapted to engage with driven spur gears 42 fixed to the projecting end 43 of the driven sleeve 37. As will be noted from Fig. 3, the cover plate 34 carries suitable anti-friction bearings for providing the upper end of the motor shaft extension 40 and driven sleeve extension 43. In order to shift the gear cluster 41, use is made of a shifter mechanism, comprising, see Figs. 4 and 5, a fork 44 integral with or secured to a sleeve 45, which has secured to its upper end means for forming a groove 46 to receive pin 47 at the inner end of an arm 48. The arm 48 is secured to one end of a stud 49, oscillatably journaled in a bearing 50 provided by a bracket 51 which is secured to the upper surface of cover plate 34. The remaining or outer end of the stud 49 has secured to it a lever 52 whereby the arm 48 is oscillated about the axis of the stud 49. It will be readily appreciated from Fig. 5 that the oscillation of the arm 48 vertically, shifts the sleeve 45 and thereby the fork 44 and gear cluster 41. In order to guide the sleeve 45 in its movement, it receives an upstanding stud 53 secured to and upstanding from the base of the gear housing or casing 33.

It should be here noted that the motor 36 of of the reversible type, and it will be appreciated from the foregoing that the motor 36, through its shaft 35 with gears 41 and 42 and driven sleeve 37, will drive the spindle 39 in reverse directions and at a speed depending on which of the gears of the gear cluster 41 is being meshed with its gear 42.

Figure 8:
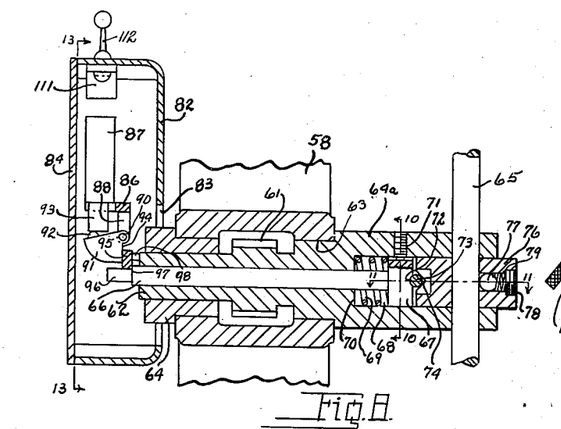
Fig. 8 is a transverse, sectional view through the spindle quill feeding mechanism, taken on line 8—8 of Fig. 7.

In order to axially move the drill, as when performing drilling or tapping operations, the lower end of the spindle 39 is mounted in a sleeve or quill 54, which provides suitable anti-friction thrust bearings for the spindle. As seen in Fig. 6, the quill 54 is revolubly secured to the spindle by a nut 55 carried by threads 56 on the spindle and a shoulder provided by the drill and tap socket 57. The quill is mounted for sliding movement in an arm 58, which is adjustably secured through a dove-tailed guide-way at its rear end to a dove-tailed guiding tongue 59 projecting from the forward face of the column 29. In order to axially adjust the quill 54 and thereby the spindle 39 and parts carried thereby, the quill has secured to it a rack 60 which meshes with rack pinion 61. The rack pinion 61, see Fig. 8, is provided on each side thereof with a bearing portion 62 and 63, the former of which is journaled in a bearing bushing 64 carried by the arm 58, while the latter is journaled in a bearing provided directly by the arm 58. Outwardly of the bearing sleeve 63, the pinion 61 is provided with a counterbored sleeve 64a. Hereinafter, these parts will be referred to in their entirety as the rack pinion sleeve, which includes the rack pinion, the bearing sleeves 62 and 63 and the projecting sleeve 64a. Mounted in the rack pinion sleeve is a lever or bar 65, actuation of which in either direction correspondingly actuates the pinion 61 and quill 54.

The foregoing is more or less conventional construction, in so far as the feeding and retraction of the quill is effected by the manual rotation of a pinion 61 and thereby the axial movement of the quill.

Figure 7:
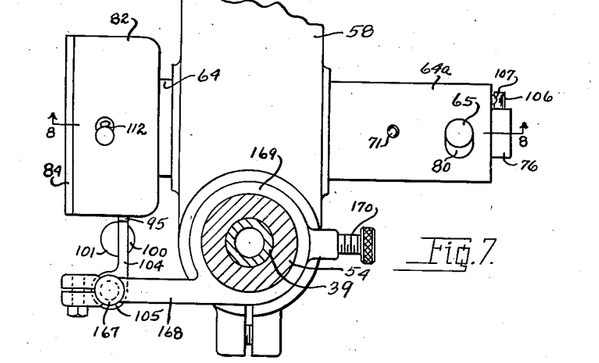
Fig. 7 is an enlarged, transverse view showing in plan the tapping mechanism, taken on line 7—7 of Fig. 1.

As seen in Fig. 8, the rack pinion is hollow and has disposed therein a shaft 66 which is provided at its outer end with a head 67. The head 67 is disposed in a counterbore 68 in the projecting portion 64a of the rack pinion sleeve, and this head has abutting its under surface one end of a spring 69, whose other end abuts the base 70 of the counterbore 68. In order to prevent rotation of the shaft 66, its head 67 is provided with a slot receiving the nose of a set screw 71, thereby insuring merely an axial movement of the shaft 66 and its head 67. The outer end of the head 67 is provided with a seat 72, in which is disposed a pin 73, which extends entirely across the counterbore 68, as clearly illustrated in Fig. 11. The other side of the pin 73 is disposed in a pair of V-notches 74 and 75, formed at the inner end of a counterbored plug 76. The plug 76 has passing through it the said lever 65, and in order to hold the lever 65 yieldably, the plug 76 houses a spring pressed ball 77, which engages against the adjacent face of the lever 65 and the yielding tension of which ball 77 is adjustable by a screw plug 78 which bears against a spring 79, which in turn bears against the ball 77. The aperture through the rack pinion sleeve through which the lever 65 passes is elongated as at 80 in Figs. 7 and 12, and the purpose of which will be subsequently described.

Secured to the arm 58 on the side opposite to that from which the pinion sleeve extension projects, as by means of a lug 81, is a housing 82 which encloses the tapping control mechanism, and which is operated by the shaft 66. The housing 82 has one end provided with an aperture 83, whereby the control mechanism enters the housing and has its other end suitably closed by a cover plate 84. Secured to one side 85 of the housing 82 and interiorly thereof, is a bracket 86 supporting a switch 87. In addition, the bracket 86 has depending therefrom a pair of arms 88 and 89, between which is pivotally mounted, as at 90, a rocker member 91. The rocker member 91 may be conveniently provided with a knob 92, which engages the push button 93 of the switch 87. The rear end of the rocker member 91 is straight or vertical, as at 94, and rests against one vertical face of a lever 95. The lever 95 has its bottom face resting on the upper end of a reduced portion 96 of the shaft 66 and finally the lever 95 has its other vertical face engaging with the shoulder 97 provided at the base of the shaft reduced portion 96. Also, the lever 95 has projecting from it a pin 98, whose inner flat surface engages with the end of the pinion bearing sleeve 64.

The lever 95 projects laterally of the housing 82 and has one end projecting therebeyond, and which projecting end is pivoted at 99 to the fork end 100 of a pivot 101. Projecting from the pivot 101 is a pivot pin 102 oscillatably disposed in a bore in a lug 103 projecting laterally from the housing 82. Integral with and projecting angularly upwardly and outwardly from the lever 95, is a lever 104, which, together form a bell crank pivoted at the junction of the arms of the crank. The portion 104 of the bell crank, at its upper end, is enlarged as at 105.

From the foregoing, it will be noted that the bell crank lever 95—104 is mounted for vertical oscillation by the pivot 99 and horizontal oscillation by the pivot 101. In order to return the arm to the position shown, which may be termed the normal position, use is made of a leaf spring 106 secured to the housing 85 by the bracket 86, and having its upper end engaging with the lever 95.

Figure 12:
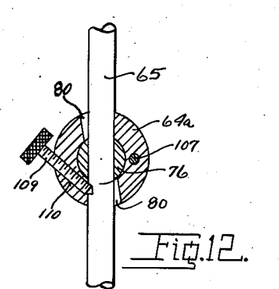
Fig. 12 is a vertical, sectional view, taken in a plane ahead of Fig. 10, on line 12—12 of Fig. 11.

The operation of the mechanism thus far described is as follows:

When either drilling or tapping, the lever 65 is actuated toward the operator, as seen in Fig. 8, or in a counterclockwise direction, as seen in Fig. 12. The initial movement of the lever 65 will be to take up the play in the elongated aperture 80, and since the lever has no relative movement with the plug 76, it will oscillate said plug in a counterclockwise direction. This movement of the plug 76 causes the V-shaped cradles 74 and 75, at its inner end, to eject the transverse pin 72 and thereby axially shift to the left the shaft 66 and the head 67 and compressing the spring 69. This movement of the shaft 66, through its shoulder 97, oscillates the bell crank 95—104 about the vertical axis of the pivot 101, and this lever actuates the rocker member 91 in a clockwise direction about its pivot 90 for actuating switch push button 93 and closing the contacts of switch 87. As will later be pointed out, the closing of the switch contacts 87 starts the rotation of the motor in a drilling or advance tapping direction.

After the tap has finished its tapping operation, the lever 65 is actuated away from the operator, as seen in Fig. 8, or in a clockwise direction, as seen in Fig. 12, thereby lining up the cradles 74 and 75 with the transverse pin 73 and allowing the spring 69 to return the parts to the position shown in Fig. 8, whereupon a spring associated with the push button 92 pushes the same to the position shown for completing an electrical circuit for reversing the direction of rotation of the spindle drive motor, and backing the tap from the work.

Figure 9:
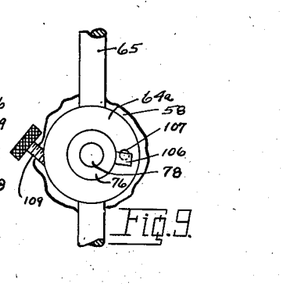
Fig. 9 is a fragmentary, end elevational view of a portion of Fig. 8, as seen from the right hand end thereof.
Figure 10:
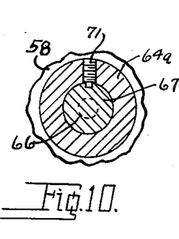
Fig. 10 is a fragmentary, sectional view, taken on line 10—10 of Fig. 8.
Figure 11:
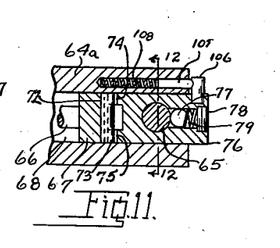
Fig. 11 is a longitudinal, fragmentary, sectional view, taken on line 11—11 of Fig. 8.

In order to hold the lever 65 in either its tap advancing or tap retracting positions, use is made of a yieldable detent, illustrated most clearly in Figs. 9 and 11. As shown in Fig. 11, the plug 76 has projecting from one side thereof a pin 106 which lies parallel to and adjacent the end of the pinion sleeve extension 64a. Co-operating with the pin 106 is the detent dog 107 disposed within a bore in the pinion sleeve extension 64a, and which dog is backed by a spring 108 abutting on one end with the dog and on its other end the base of the bore.

In the event it is desired to do merely plain drilling operations, and not operate a tap, the handle 65 may be locked against movement for reversing the switch 87. This mechanism is illustrated in Fig. 12, and comprises a jam screw 109 threaded into a tapped aperture 110 extending angularly of the counter bore 68 in the pinion sleeve extension 64a. As will be seen from Fig. 12, by screwing the jam screw 109 downwardly, the handle 65 will be made to take up the play in the elongated aperture 80, thereby closing the switch 87 and preventing the reverse operation of this switch, and causing the drill spindle to rotate in a forward or drilling direction at all times, even though the handle 65 is actuated to retract the drill.

This result, namely the rotation of the motor in a forward or drilling direction, regardless of how the handle 65 is actuated, may be accomplished electrically. For this reason, there is mounted within the switch housing 82, a second switch 111 operable by a toggle lever 112 which projects through the switch housing 82 thereabove.

Figure 20:
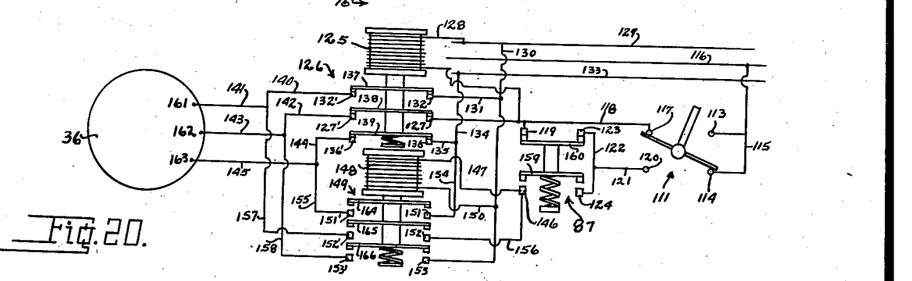

In Fig. 20, there is illustrated diagrammatically the electrical mechanism and switches operated by the above described mechanism. As there shown, the toggle switch 111 has two of its fixed contacts 113 and 114 electrically connected by wire 115 with wire 116 of the main power source. A third fixed contact 117 is connected by a wire 118 with a fixed contact 119 of the switch 87. The fourth fixed contact 120 of the toggle switch 111 is connected by wires 121 and 122 with fixed contacts 123 and 124 of switch 87. The fixed contact 117 of toggle switch 111 and the fixed contact 119 of limit switch 87, are further connected with one end of the solenoid coil 125 of solenoid switch 126, as well as fixed contact 127 of solenoid switch 126. The other end of solenoid coil 125 is connected by wire 128 with a second wire 129 of the power source, and this main wire 129 is connected by wires 130 and 131 with a second fixed contact 132 of solenoid switch 126. The third wire 133 of the main power source is connected by wires 134 and 135 with a third fixed contact 136 of the solenoid switch 126.

The solenoid switch 126 includes three bar switches 137, 138 and 139, adapted respectively to connect the fixed contacts 132, 127 and 136 with companion fixed contacts respectively indicated by reference characters 132', 127' and 136'. The fixed contact 132' is connected by wires 140 and 141 with the field coils of the spindle rotating motor 36; the fixed contact 127' is connected by wires 142 and 143 with said field coils of the motor 36, while the fixed contact 136' is connected by wires 144 and 145 with the motor field coils.

From the foregoing, and with the toggle switch in the position illustrated in Fig. 20, which is the drilling position exclusively, the coil 125 is energized for closing the solenoid switch contacts and effecting the rotation of the motor 36 in the drilling direction. This drilling direction rotation of the motor will continue, regardless of the position of the switch 87, since even though it is actuated, it can exercise no effect on the parts. If, now, the toggle switch 111 is actuated to its other position for electrically connecting fixed contacts 113 and 120 thereof, then the operation of the switch 87 does control the direction of rotation of the motor.

The switch 87 has a fourth contact 146 which is electrically connected by a wire 147 with one end of a coil 148 of a second solenoid switch 149. The coil 148 has its other end connected by wires 150 and 130 with the power line 129. The solenoid switch 149, similar to the solenoid switch 126, has three pairs of fixed contacts 151 and 151', 152 and 152' and 153 and 153'. These pairs of fixed contacts are adapted to be bridged by bar contacts 164, 165 and 166 respectively. The contact 151 is connected by wires 154 and 134 with the power line 133, while its companion contact 151' is connected by wires 155 and 145 to the field coil of motor 36. The fixed contact 152 is connected with the contact 146 of the switch 87 by a wire 156, while its companion contact 152' is connected by wires 157 and 141 with the field coil of the motor 36. The contact 153 is connected with the power line 129 by the wire 130, while its companion contact 153' is connected by wires 158 and 143 with the field coil of the motor 36. The contact 146 of the switch 87 is connected by bar contact 159 with the contact 124 and through lines 122 and 121, toggle switch 111 and wire 115 with the power line 116. The fixed contact 119 of the switch 87 is likewise connected with contact 123 by a bar contact 160 and through lines 122 and 121, toggle switch 111 and wire 115 with the power line 116.

From the foregoing, it will be noted that with the toggle switch in the second position from that shown in Fig. 20, namely, connecting contacts 113 and 120, and with the switch 87 in the position shown, the solenoid switch 126 is closed for connecting, first, power line 129 with the field coil at point 161, second, power line 116 with the field coil at point 162 and third, power line 133 with the field coil at point 163. Upon the shifting of the switch 87 through the actuation of handle 65, the electrical connection of contacts 119 and 123 is broken and an electrical connection established across contacts 124 and 126, thereby de-energizing solenoid switch 126 and energizing solenoid switch 149. The closing of the solenoid switch 149 connects the power line 133 with the motor field coil at point 163 the same as solenoid switch 126 did. The power line 116 is now connected with the motor field coil at point 161 instead of at point 162 as did the solenoid switch 126 and the power line 129 is connected with the motor field coil at point 162 instead of point 161, as did the solenoid 126. In other words, the field coil excitation is reversed for thereby reversing the direction of rotation of the motor 36 and backing off the tap.

Figure 13:
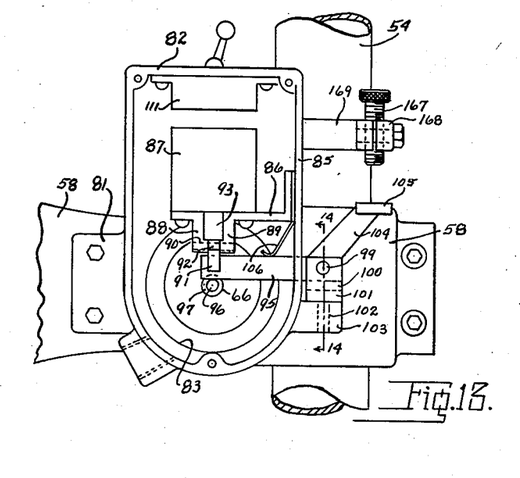
Fig. 13 is a view in elevation, taken just behind the cover plate of the tapping attachment, on line 13—13 of Fig. 8.
Figure 14:
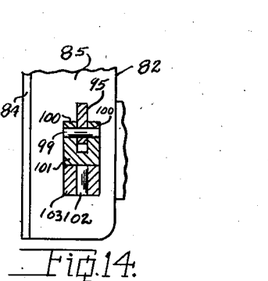
Fig. 14 is a fragmentary, sectional view, taken on line 14—14 of Fig. 13.

As is frequently necessary, so-called blind holes are tapped, that is, holes which do not go entirely through the work piece but go down a certain depth to bottom. In drilling holes of this nature, the same operation as above described is effected, that is, the handle 65 is actuated toward the operator, as seen in Fig. 8, for shifting the shaft 66 and actuating the rocker member 91 in a counterclockwise direction. The motor is then rotating in a direction for tapping, and the tap is fed into the hole by continuing to pull on the lever 65. When the tap is at the bottom of the blind hole, a dog screw engages the head 105 on the lever 104 of the bell crank 95—104. This dog screw, indicated in the drawings by reference numeral 167, is adjustably mounted in a threaded aperture in an arm 168 which has at its other end a ring 169 that encircles the drill quill 59, all as clearly illustrated in Figs. 7 and 13. As will be seen from these figures, the ring 169 is provided with a clamp screw 170, whereby its longitudinal position is adjustable with respect to the quill 54. As further seen from Fig. 7, the parts are so arranged as to have the dog screw 167 directly over the head 105 of arm 104.

The operation of this depth tapping mechanism is as follows:

The engagement of the dog screw 167 with the head 105 actuates the bell crank 95–104 in a clockwise direction about the axis of the pivot 99, thereby raising the arm 95 above the shaft shoulder 97. This then releases the pressure on the spring associated with the push button 93 of the switch 87, so that said spring actuates the rocker member 91 in a counterclockwise direction, forcing the lever 95, which is now above the shoulder 97, to the right, as seen in Fig. 8, about the axis of the pivot 101. This then immediately reverses the direction of rotation of the motor 36 and the tap is backed out of the hole by reversely actuating the lever 65.

It should be noted that the movement of the lever 95 by the pusher 91 about the axis of the pivot 101 is limited by the engagement of the pin 98, projecting from the lever 95, engaging with the end of the pinion sleeve extension 62 and with the said lever resting on the surface of the shaft 66, but ahead of the shoulder 97. When the lever 65 is actuated to retract the tap from the hole, the shaft 66 is actuated to the right, as seen in Fig. 8, and therefore retracts the shoulder 97 to a point ahead of the lever 95, and said lever, due to the leaf spring 106 is then actuated behind the shoulder 97 and to its normal position for resetting the motor for a subsequent tapping operation.

In Figs. 15 to 19 inclusive, a tapping mechanism is disclosed which accomplishes the same purposes as that above, different, however, in mechanical detail. Specifically, this modified structure comprises a pinion sleeve, including the pinion 171, having extensions 172 and 173, the former of which is journaled in a bushing 174 pressed into the arm or bracket 58, while the latter spindle extension 173 is journaled directly in the arm 58. Mounted on the outer surface of the pinion sleeve extension 173 is a slidable sleeve 175 having a radial flange 176 at its inner end. Secured to the outer end of the slidable sleeve 175 is a plug 177, through which passes the handle 65, retained in position by a yieldable plug 178, similar to the ball 77 above referred to. The plug 177 has projecting inwardly thereof a spindle 179 adapted to abut with the inner end of a lock out screw 180.

Figure 15:
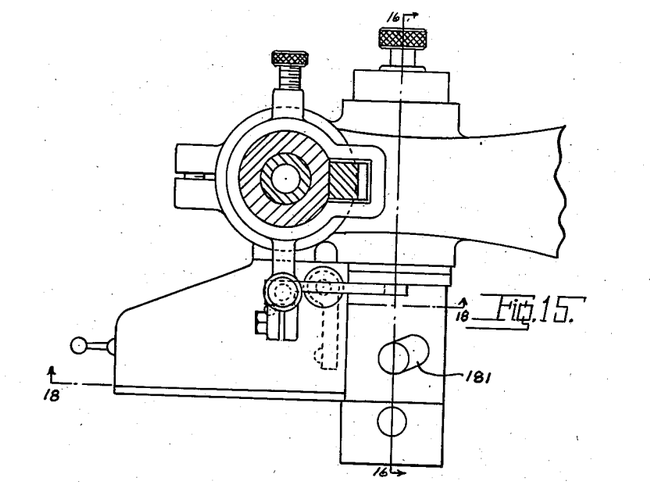
Fig. 15 is a view similar to Fig. 7, showing a modification in the mechanism for accomplishing the objects of this invention.

The sliding sleeve 175, see Fig. 15, is provided at diagrammatically opposite points with an elongated angularly disposed aperture 181, in one of which is disposed a roller 182 carried by the pinion sleeve extension 173 and held in position by a headed stud 183. In the other elongated aperture 181 is the head 184 of a screw 185.

Engaging ahead of the radial flange 176 of the sliding sleeve 175 is one end of a lever 186 which is pivotally mounted intermediate its ends at 187 in the forked end of a pivot member 188. The pivot member 188 has projecting therefrom a shaft 189, journaled in suitable bearings provided by a switch housing 82' which, while different in external configuration, is substantially identical to the switch housing 82 above described. Between the shaft bearings, and within the housing 82', the shaft 189 has secured thereto a lever 190 adapted to have its free end engaged with and operate the push button 93' of a switch 87' which is similar in all respects to the switch 87 above referred to. The lever 186 is yieldably biased by the leaf spring 191 to at all times assume the normal position illustrated in the drawings. As will be seen from Fig. 18, the switch housing 82' contains a toggle switch 111' which is identical to the toggle switch above referred to and described.

The operation of the tap reversing switch mechanism is as follows:

When it is desired to effect a tapping operation, the lever 65 is actuated toward the operator for first rotating and longitudinally sliding the sliding sleeve 175 and which sliding is effected by camming operation of the elongated angular aperture 181 on the roller 182. This causes the radial flange 176 to shift the lever 186 downwardly in Fig. 15 or toward the observer in Fig. 18, and actuates the pivot member 188 and its shaft 189 in a clockwise direction, as seen in Fig. 15, or toward the observer in Fig. 18, for actuating the switch push button 93'. This closes the proper contacts within the switch 87', or, as seen in Fig. 20, within the switch 87, for effecting a tapping operation. When the tapping operation is completed, and it is desired to retract the tap, the lever 65 is reversely operated, or pushed away from the operator, for first shifting the sliding sleeve 175 to the left, as seen in Fig. 15, and returning the parts to their normal position, whereupon the motor 36 is reversed and the tap retracted.

Figure 16:
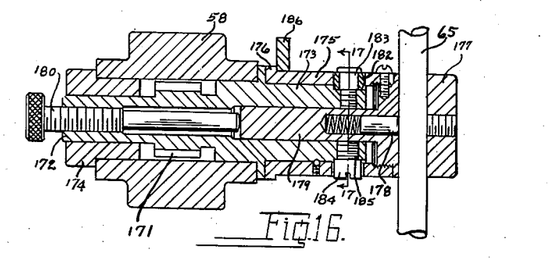
Fig. 16 is a longitudinal, sectional view through the spindle quill feeding mechanism and tapping attachment operating means.
Figure 17:
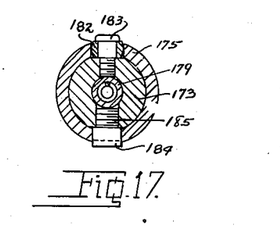
Fig. 17 is a transverse, sectional view taken on line 17—17 of Fig. 16.
Figure 18:
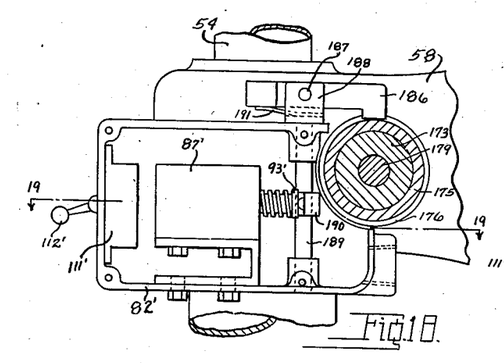
Fig. 18 is a view similar to Fig. 13, taken behind the cover plate of the modified tapping operation control mechanism.
Figure 19:
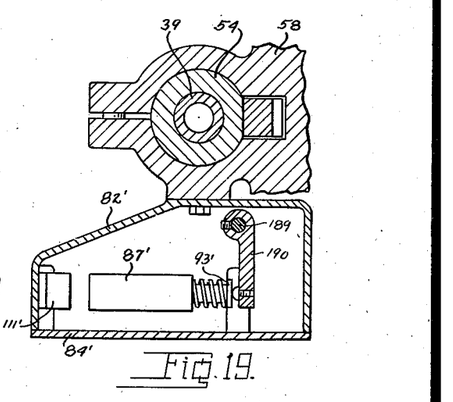
Fig. 19 is a transverse, sectional view, taken on line 19—19 of Fig. 18.

As was noted above, in this modified structure, use is made of the toggle switch 111', which, as above described, to electrically lock out the reversing switch 87' so that the operation of the handle 65 will not control the direction of rotation of the motor 36. In order to do this mechanically, use is made of the lock out screw 180 by turning said screw to actuate the plug 178 and its spindle 179 to the right, as seen in Fig. 16, and allowing no play between these parts, which is normally there between the elongated aperture 181 and its roller 182.

Suffice it to say that the electric wiring of Fig. 20 has equal application to the mechanism just described as to that initially described.

Figure 21:
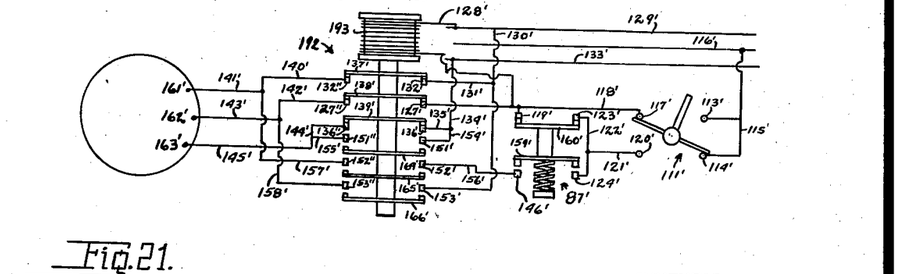
Fig. 21 is a diagrammatic view similar to Fig. 20, illustrating a modification in the mechanism employed.

The wiring diagram in Fig. 21 differs from that in Fig. 20 to the extent that a combination solenoid and gravity switch 192 is employed instead of a pair of solenoid switches. In other words, with the parts in the position illustrated, the solenoid coil 193 is energized for closing the switch and rotating the motor 36 in one direction. Upon de-energization of the solenoid coil 193, the switch drops by gravity to break the initial setting, establishing a switch connection for reversely actuating the motor 36. It is believed, in view of the minute description of Fig. 20, that a further description of Fig. 21 is unnecessary. There has, however, for purpose of comparison, been applied to Fig. 21 the same reference characters of Fig. 20, with the addition thereto of a prime mark.

It is believed from the foregoing, that it is now evident that there has been provided a tapping attachment for drilling machines and the like which will meet all of the objects initially set forth.

What is claimed is:

1. In a machine tool of the class described having a spindle mounted for reverse rotation and reverse axial translation, a reversible motor for rotating the spindle, and a manually rotatable rack and pinion mechanism for translating the spindle, the combination of a lever for operating the rack and pinion mechanism, the connection of the lever with the rack and pinion providing a small amount of lost motion for the lever, a reversing switch for controlling the rotation of the motor, an arm pivotally mounted for actuating the switch, a cam associated with and operated by the lever, and a member axially movable by the cam and lever during the movement of the lever to take up the lost motion between itself and the rack and pinion for actuating the arm to operate the switch and rotate the motor in a forward direction prior to the actuation of the rack and pinion mechanism by the lever.

2. In a machine tool of the class described having a spindle mounted for reverse rotation and reverse axial translation, a reversible motor for rotating the spindle, and a manually rotatable rack and pinion mechanism for translating the spindle, the combination of a lever for operating the rack and pinion mechanism, the connection of the lever with the rack and pinion providing a small amount of lost motion for the lever, a reversing switch for controlling the rotation of the motor, an arm pivotally mounted for actuating the switch, a cam associated with and operated by the lever, and a member axially movable by the cam and lever during the movement of the lever to take up the lost motion between itself and the rack and pinion for actuating the arm to operate the switch and rotate the motor in a forward direction prior to the actuation of the rack and pinion mechanism by the lever, said switch being adapted to be reversely operated upon reverse actuation of the lever for reversely rotating the motor.

3. In a machine tool of the class described having a spindle mounted for reverse rotation and reverse translation, a reversible motor for effecting the spindle rotation, and a rack and pinion mechanism for effecting reverse translation, the combination of a lever for operating the rack and pinion mechanism, the connection of the lever with the rack and pinion providing a small amount of lost motion for the lever, a reversing switch for the motor, a pivotally mounted arm for operating the switch in one direction and which switch is yieldably operated in the other direction, a cam associated with and operated by the lever and a member axially movable in one direction by the cam upon operation of the lever during the movement thereof to take up the lost motion for actuating the arm and switch to effect rotation of the motor in one direction prior to the actuation of the rack and pinion mechanism by the lever and said member being axially movable in the opposite direction upon reverse actuation of the lever and cam to permit reverse operation of the switch and rotation of the motor in the reverse direction.

4. In a machine tool of the class described having a spindle mounted for reverse rotation and reverse translation, a reversible motor for effecting the spindle rotation, and a rack and pinion mechanism for effecting reverse translation, the combination of a lever for operating the rack and pinion mechanism, the connection of the lever with the rack and pinion providing a small amount of lost motion for the lever, a reversing switch for the motor, a pivotally mounted arm for operating the switch in one direction and which switch is yieldably operated in the other direction, a cam associated with and operated by the lever, a member axially movable in one direction by the cam upon operation of the lever during the movement thereof to take up the lost motion for actuating the arm and switch to effect rotation of the motor in one direction prior to the actuation of the rack and pinion mechanism by the lever and said member being axially movable in the opposite direction upon reverse actuation of the lever and cam to permit reverse operation of the switch and rotation of the motor in the reverse direction, and a selector switch electrically connected across the reversing switch to prevent operation of said reversing switch by the lever.

5. In a machine tool of the class described having a spindle mounted for reverse rotation and reverse translation, a reversible motor for effecting the spindle rotation, and a rack and pinion mechanism for effecting reverse translation, the combination of a lever for operating the rack and pinion mechanism, the connection of the lever with the rack and pinion providing a small amount of lost motion for the lever, a reversing switch for the motor, a pivotally mounted arm for operating the switch in one direction and which switch is yieldably operated in the other direction, a cam associated with and operated by the lever, a member axially movable in one direction by the cam upon operation of the lever during the movement thereof to take up the lost motion for actuating the arm and switch to effect rotation of the motor in one direction prior to the actuation of the rack and pinion mechanism by the lever and said member being axially movable in the opposite direction upon reverse actuation of the lever and cam to permit reverse operation of the switch and rotation of the motor in the reverse direction, and means for actuating the lever to take up the lost motion thereof and lock the lever in this position to effect axial movement of the member to operate and lock the pivotally mounted arm and switch for rotating the motor in one direction only even upon reverse actuation of the lever.

6. In a machine tool of the class described having a spindle mounted for reverse rotation and reverse translation, a reversible motor for effecting the spindle rotation, and a rack and pinion mechanism for effecting reverse translation, the combination of a lever for operating the rack and pinion mechanism, the connection of the lever with the rack and pinion providing a small amount of lost motion for the lever, a reversing switch for the motor, a pivotally mounted arm for operating the switch in one direction and which switch is yieldably operated in the other direction, a cam associated with and operated by the lever, a member axially movable in one direction by the cam upon operation of the lever during the movement thereof to take up the lost motion for actuating the arm and switch to effect rotation of the motor in one direction prior to the actuation of the rack and pinion mechanism by the lever, and said member being axially movable in the opposite direction upon reverse actuation of the lever and cam to permit reverse operation of the switch and rotation of the motor in the reverse direction, said arm having a second pivotal mounting for movement in a direction normal to that given it by the axially movable member, and means operable independently of the lever for actuating the arm about its second pivotal mounting while the lever is in the position for holding the switch in a position for rotating the motor in one direction and thereby permitting the operation of the reversing switch to effect the rotation of the motor in a reverse direction.

7. In a machine tool of the class described having a spindle mounted for reverse rotation and reverse axial translation, a reversible motor for effecting the spindle rotation, and manually operable rack and pinion mechanism for effecting the spindle translation, the combination of a manually operable lever, means for mounting the lever on the pinion of the rack and pinion mechanism for limited independent movement prior to an actuation of the pinion thereby, an axially movable member, a pivotally mounted switch arm, a reversing switch adapted to be operated by the switch arm to cause motor rotation in a forward direction and adapted to independently operate to cause a motor rotation in a reverse direction, a cam associated with and operable by the lever during its independent movement relative to the pinion for effecting the axial movement of the axially movable member and the operation of the switch, said cam and axially movable member being reversely actuated by the switch upon reverse operation of the lever to permit the switch operation and motor reversal, and a selector switch electrically connected across the reversing switch to prevent reversal of the motor and effect continuous forward movement thereof regardless of the operation of the axially movable member.

GEORGE K. McKEE.